M. J. ULINE.
LOCKING DEVICE.
APPLICATION FILED MAR. 18, 1916.

1,211,013.

Patented Jan. 2, 1917.

Inventor
M. J. Uline

UNITED STATES PATENT OFFICE.

MICHIEL J. ULINE, OF CLEVELAND, OHIO.

LOCKING DEVICE.

1,211,013.  Specification of Letters Patent.  Patented Jan. 2, 1917.

Application filed March 18, 1916. Serial No. 85,181.

*To all whom it may concern:*

Be it known that I, MICHIEL J. ULINE, a citizen of the United States, residing at Cleveland, in the county of Cuyahoga and State of Ohio, have invented a certain new and useful Improvement in Locking Devices, of which the following is a full, clear, and exact description, reference being had to the accompanying drawings.

This invention relates to locking devices, and more particularly to devices which may be applied to motor vehicles for the purpose of preventing them from being stolen, or used by an unauthorized person.

My invention contemplates a locking device which may be conveniently applied to the steering column and housing of an automobile without interfering with the normal operation of such steering column but which, when desired, will permit of convenient and efficient locking of the column against turning.

In applying my invention, I preferably so locate the parts of the lock that the wheels will be locked in "cramped" position, whereby the vehicle cannot be towed away, as might be done were the column locked in its central or straight-ahead position.

A further object of the invention is to provide a lock of the character described which is simple of construction, relatively inexpensive of production, and the parts whereof are so arranged that, when locked, it will be practically impossible to remove the lock or to disconnect any part thereof from its associated parts.

Other objects and desirable features will appear hereinafter and will be embodied in and realized through the combinations of elements in the claims forming part hereof.

Figure 1:
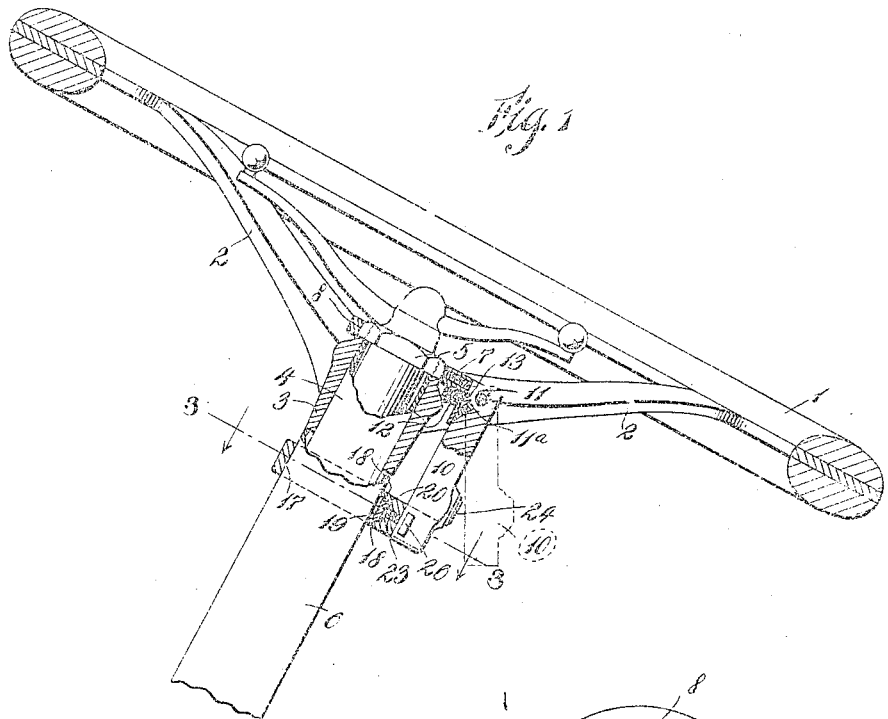
Figure 2:
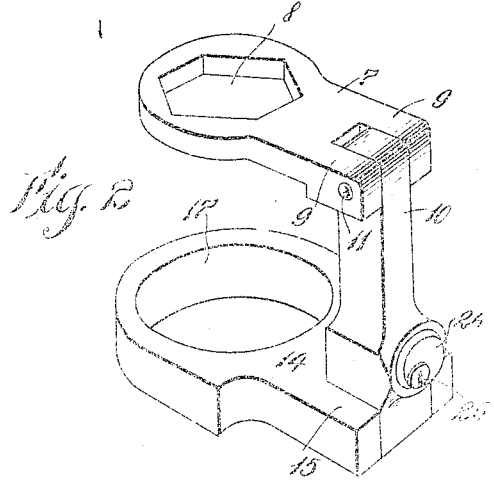
Figure 3:
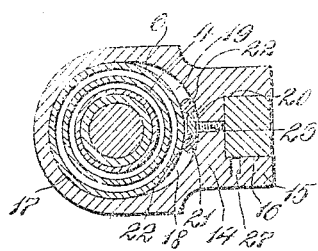

In the drawings, Figure 1 represents a view, partly in section and partly in elevation, of a steering wheel of an automobile and the upper part of the steering column and housing, showing my lock applied thereto, the open position of the latch being indicated in dotted lines; Fig. 2 is a perspective view of the lock, showing the same in closed position; and Fig. 3 a transverse sectional view corresponding to the line 3—3 of Fig. 1.

Describing by reference characters the various parts illustrated herein, 1 denotes the steering wheel of an automobile, the same being provided with spokes 2 and a hub 3 which is mounted on top of the steering column 4. On top of the column there is provided the usual hexagonal nut 5 which holds the hub in place upon the column; beneath the hub there is located the housing 6.

The lock which is employed with the above described steering mechanism consists generally of an upper member, which is adapted to be applied to a part of the column (as the hexagonal nut) and having a latch pivoted thereto, also a lower member secured to the housing and having a mortise adapted to receive the lower end of the latch, the latch carrying at such lower end a key-operated bolt.

The upper member comprises generally a plate 7 having a hexagonal opening 8 therein whereby it may be fitted to the nut 5 and secured thereto with its lower surface engaging the top of the hub 3 on the upper end of the steering column 4. The plate 7 projects radially between a pair of spokes 2 whereby it provides an arm having a pair of lugs 9 between which there is pivoted the upper end of the latch 10, this pivoting being secured through a pin 11 that is held against removal by a set screw 11ᵃ. The lower portion of the radial arm 7 is provided with a recess 12 containing a spring 13 which engages the latch 10 beneath the pivot 11, tending to hold the latch in the position shown in dotted lines in Fig. 1; that is to say, with its lower end out of engagement with the lower member of the lock.

The lower part of the lock comprises the member 14 having an opening therethrough. This opening is circular in plan but is formed in a peculiar manner which permits the lower member to be conveniently applied and clamped to the housing. The lower member, indicated at 14, is provided with a radial arm 15 which is provided with a recess 16 adapted to receive the lower end of the latch 10. The opening in the member 14 is formed by a cylindrical wall 17, whereby the member may be made to engage the column throughout the height or vertical extent of such member and throughout an angle of about 180°. The side of the member from which the arm 15 projects is recessed between the top and bottom thereof whereby a pair of vertically spaced flanges 18 are provided, the inner edges of these flanges being semicircular whereby they may bear against the housing 6. There is thus provided a crescent-shaped recess 19 between the flanges 18 and having its greatest depth adjacent to and presented toward the recess 16. This crescent-shaped recess provides an extremely convenient means of securing the lower member of the lock to the housing. The means here shown comprises a wedge block 20 the inclined sides 21 whereof are adapted to engage vertically disposed rollers 22 within the recess 19. The diameter of these rollers is substantially equal to the greatest depth of the recess whereby, as they are moved outwardly, they will bind between the side wall of the recess and the adjacent portion of the housing 6. This adjustment of the wedge may be secured by means of a screw 23 which is threaded into a bore provided in the arm 15, between the bottom or inner end of the recess 16 and the recess 19. This screw will be of such length as to be entirely contained within the bore, notwithstanding a considerable range of adjustment. It will be apparent that, by setting up on the screw 23, the block 20 will be pushed toward the housing 6, thereby spreading the rollers 22 apart and firmly connecting the lower locking member to the housing.

The latch 10 is provided with a lock 24 of standard construction having a rotary barrel and adapted, by its rotation through a key inserted at 25, to project a bolt 26 into the locking recess 27; also to withdraw said bolt from said recess.

From the drawing and the foregoing description it is believed that the operation will be easily understood. While running the car, the lock 24 will be open and the latch 10 will be held away from the coöperating portion of the lower fixed lock member by means of the spring 13. When it is desired to stop the vehicle and leave the same, the steering wheel is turned until the latch 10 is brought into proper relation to the slot or recess 16, when it is swung down into such recess against the resistance of the spring 13 and is locked in place by a key between the side walls of the recess. As previously stated, the two locking members will preferably be so arranged that when in locking position the front wheels of the automobile will be cramped. It will be evident that, with the wheels cramped, it will be impossible for any one to tow the machine away, as it will not only fail to steer properly but its erratic movements will naturally excite suspicion.

It will be observed that the parts of my lock are clamped securely in place so as to make their removal practically impossible. The means for clamping the lower locking member will be entirely covered and protected by the latch when the latter is in locked position.

While the invention is particularly adapted for the purpose set forth, it is also applicable to other constructions comprising concentrically arranged relatively rotatable members.

Having thus described my invention, what I claim is:—

1. The combination, with a steering column and a housing therefor, the steering column having a polygonal member thereon, of a locking device comprising an upper member having an opening adapted to fit such polygonal member, an arm projecting from such opening, a latch pivoted to said arm, and a spring tending to swing the lower end of the latch away from the column and the housing, a lower locking member secured to the housing and having a latch engaging portion, and means for locking the latch in operative relation to such portion of the lower member.

2. The combination, with a steering column and a housing therefor, the steering column having a polygonal member, of a lock comprising an upper member having an opening adapted to receive and fit said polygonal portion and having an arm projecting from such opening, a latch pivoted to said arm, means carried by the upper member adapted to hold the lower end of the latch away from the steering column, a locking member secured to the steering column and having one or more projections adapted to engage the lower portion of the latch, and a lock carried by the latch whereby it may be secured to the lower member of the locking device.

3. The combination, with a steering column and a housing therefor, of a locking member secured to the column, a second locking member on the housing, the second locking member having an aperture to receive the column, one side of the aperture wall being provided between the top and bottom thereof with a substantially crescent-shaped recess, a pair of rollers vertically disposed in said recess, a wedge interposed between said rollers, an adjusting device for moving said wedge thereby to spread the rollers apart, and a latch carried by the upper member and adapted to be secured to the lower member in such position as to cover said device.

4. The combination, with a steering column and a housing therefor, of a lock comprising an upper member carried by the column and having an arm, a latch movably connected to said arm, a lower member having a bore therethrough adapted to receive the column, one side of said bore having a substantially crescent-shaped recess between top and bottom flanges adapted to engage the housing, an abutment on the lower member for the latch, a pair of vertically disposed rollers within the crescent-shaped recess and between the flanges thereof, a wedge member in said recess and interposed between the rollers, an adjusting device mounted in said lower member and adjustable therein to move the wedge to spread the rollers apart, and means whereby the latch may be locked in operative relation to said abutment and covering said device.

5. The combination, with a pair of concentric relatively rotatable members, of a locking member secured to one of such concentric members, a second locking member having an aperture therethrough for the other concentric member, one side of the aperture being provided between the top and bottom thereof with a recess diminishing in depth from the central portion thereof, a pair of rollers vertically disposed in said recess, a wedge in the central portion of said recess between said rollers, and an adjusting screw for moving said wedge thereby to spread the rollers apart and means whereby the screw may be covered and the locking members may be secured together when the concentric members occupy a predetermined position.

6. The combination, with a steering column and a housing therefor, of a lock comprising an upper member carried by the column and having an arm, a latch pivoted to said arm, a lower member having a bore therethrough adapted to receive the column, one side of said bore having a substantially crescent-shaped recess with top and bottom flanges adapted to engage the housing, an arm or projection extending from said recess and having a recess therewithin for the latch, a pair of vertically disposed rollers within the crescent-shaped recess and between the flanges thereof, a wedge member in said recess and interposed between the rollers, a screw adjustable through the wall between the two recesses whereby the wedge may be moved to spread the rollers apart, the latch being arranged to cover the screw when locked and means whereby the latch may be locked in the second recess.

In testimony whereof, I hereunto affix my signature in the presence of two witnesses.

MICHIEL J. ULINE.

Witnesses:
R. L. BRUCK,
H. J. SMALL.